Sept. 15, 1970 W. E. CRANDALL 3,529,304

MICROSECOND SIGNAL RECORDING EMPLOYING MAGNETIC CABLE WITHIN DELAY LINE

Filed June 14, 1966 2 Sheets-Sheet 1

INVENTOR:
Walter E. Crandall
By William W. Rundle
AGENT

INVENTOR:
Walter E. Crandall
By William W. Rundle
AGENT 3,529,304

MICROSECOND SIGNAL RECORDING EMPLOYING MAGNETIC CABLE WITHIN DELAY LINE

Walter E. Crandall, Malibu, Calif., assignor to Northrop Corporation, Beverly Hills, Calif., a corporation of California Filed June 14, 1966, Ser. No. 557,573
Int. Cl. G11b *5/02, 5/74;* H03h *13/00*
U.S. Cl. 340—174.1 7 Claims

ABSTRACT OF THE DISCLOSURE

A recording medium in the form of a stationary length of magnetic coaxial cable positioned in a similar length of hollow electronic delay line. A short signal to be recorded is fed to the delay line, and at the instant the signal is spatially distributed along the line, a bias pulse is applied to the coaxial cable. This produces a remnant magnetized condition of the cable which corresponds to the input signal, and this recorded signal can be subsequently reproduced by drawing the coax cable through a reading coil.

The present invention relates to recording, and more particularly, to a means and method of magnetic or electric recording of short-duration signals in the microsecond region. A means and method of reading the signal and producing a visual record of the signal are also provided.

For recording extremely short-duration signal information, the common practice today is to photograph an oscilloscope trace of the desired signal. If the signals are pulses in a radiation environment, the oscilloscope is located outside this environment. Since several channels of information may be generated, many oscilloscopes and great lengths of connecting cables must be used, which is all very costly.

On the other hand, conventional magnetic tape and wire recorders cannot achieve the required short time sweep and high frequency response. Hence, presently known equipment and techniques for the stated purpose are either entirely unsatisfactory in performance or very time-consuming and expensive.

The main objects of this invention are to provide a recording system which has a multimegacycle response and time sweep in the region of microseconds, is resistant to shock and vibration, is simple and light in weight, and inexpensive.

Further objects of the present invention are to provide such a recording system which can have a millivolt input sensitivity, and has a non-destructive readout.

Other objects and features of advantage will be noted or will become apparent from the specification of detailed apparatus to follow.

Briefly as to method, my invention comprises transporting a signal field spatially, and recording the desired signal on a recording medium using a writing field in the presence of the signal field. The recorded signal is later read by causing relative motion between the record medium and an associated reading device such as a coil connected to a reading circuit.

Briefly as to apparatus, my invention comprises a hollow delay line to which the signal is to be fed, a coaxial type of cable having a magnetic material conductor placed within the delay line, and means for producing a bias pulse on the aforesaid conductor at the time the recording is to be made, i.e., when the signal is present along the delay line, the bias pulse producing the aforesaid writing field. The record is then in the form of the remnant magnetization of the coaxial cable. Several such lengths of line can be used at once to record separate signals.

This invention may be more fully understood by reference to the detailed description to follow, and to the accompanying illustrative drawings, wherein.

Figure 1:
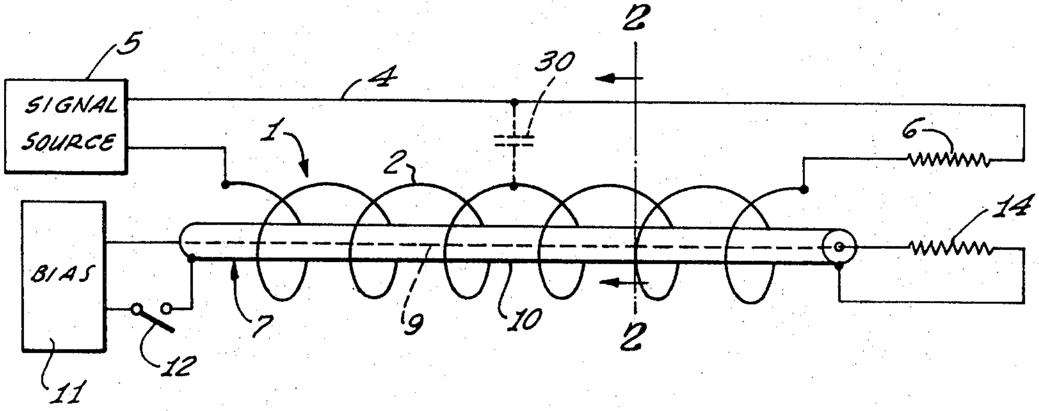
FIG. 1 is a diagrammatic view of the present recording system, showing the apparatus of the invention in a form from which the principles of operation are readily seen.

Referring first to FIG. 1 for a description of my invention, there is provided a length of more or less conventional electronic delay line 1, consisting of an inner helical winding 2 and an outer conductor 4. The outer conductor 4 is in reality the outer circumferential conductor of a cylindrical delay line, for example. A signal source 5 is connected at one end of delay line 1 between the inner winding 2 and the outer conductor 4, and a terminating resistance 6 is connected at the other end between the same two elements. Resistance 6 preferably has the same value as the characteristic impedance of the delay line 1.

Delay line 1 is hollow, and a coaxial cable 7 is removably located therein along the axis of delay line 1. Cable 7 consists of a central conductor 9 of magnetic material, and an outer cylindrical conductor 10 as is common. A bias source 11 is connected at one end of the coaxial cable 7, through a momentary switching means 12, between the central magnetic conductor 9 and the outer conductor 10. A terminal resistor 14 having the same value as the coaxial cable characteristic impedance is connected at the far end thereof between the central conductor 9 and the outer conductor 10. Terminal resistor 14 is for the purpose of preventing reflections of the bias pulse back along the cable 7.

The input signal to the delay line 1 propagates an axial magnetic field down the delay line. The magnetic field distribution along delay line 1 is directly proportional to the input signal. This field is of insufficient strength by itself to magnetize the central conductor 9 of the coaxial cable 7. However, anhysteretic magnetization of the central conductor 9 is achieved by applying a bias pulse, such as a damped AC pulse, to the coaxial cable 7. This is done effectively instantaneously so that the signal magnetic field along the delay line 1 at that instant is imposed on corresponding points of the central conductor 9 (which is the recording medium) of the coaxial cable. Thus a permanent record of the input signal is obtained at any time by transmitting a bias pulse. The record is in the form of the remnant magnetization, and its effective length will depend on the physical length of the coaxial cable 7 and the time delay of the same length of the delay line 1.

Figure 2:
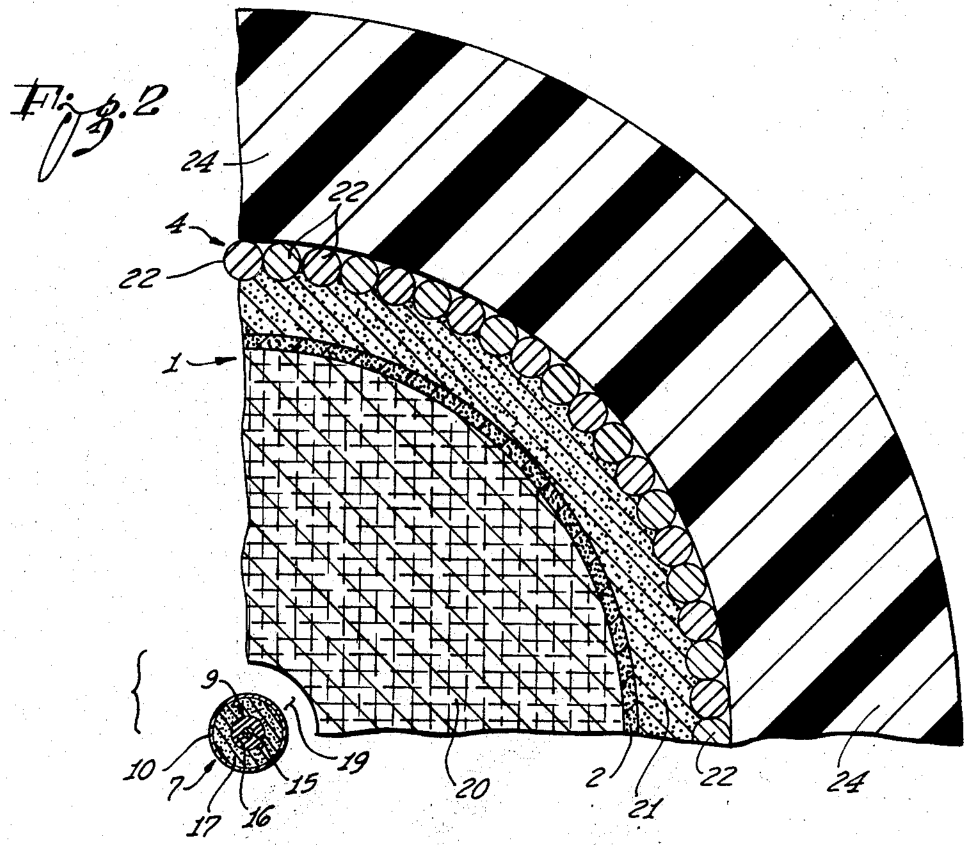
FIG. 2 is a partial cross section view of the recorder, taken as indicated by the line 2—2 in FIG. 1, showing an actual embodiment of line construction.

A typical magnetic recorder which may be used in this invention is shown in cross section in FIG. 2. Here, the central coaxial conductor 9 comprises an inner wire 15 and a ferro-magnetic coating 16 thereon. A polyethylene dielectric 17, for example, separates the central from the outer coax conductor 10, which is preferably thin copper.

An air space 19 is allowed between the coaxial cable and the delay line for ease in inserting and removing the cable. The first inner portion of the delay line 1 may consist of a layer of a magnetic mixture 20 such as a ferrite material, although this is not necessary to the invention. The same relative dimensions, however, should be preserved to avoid coupling of the input signal to the coaxial cable outer conductor 10. In the event magnetic mixture 20 is not used, the space occupied by mixture 20 should be filled with insulating material as a spacer. The helical winding 2 is next, which may be copper, followed by more dielectric insulation 21, and then the outer delay line conductor 4, shown here as many parallel copper wires 22. An outer plastic covering 24 completes the construction of the delay line 1.

Figure 3:
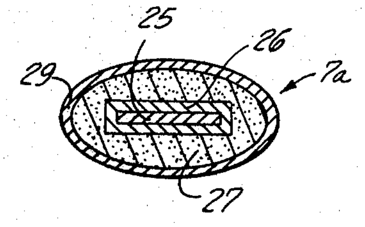
FIG. 3 is a cross section view showing an alternate form of coaxial cable which may be preferred.

FIG. 3 shows an alternate form of coaxial cable 7*a*. This comprises a thin flat copper center 25 with a magnetic coating 26 such as a nickel, having more surface area than a round conductor for greater sensitivity and less distortion. Insulation 27 is then surrounded by an oval outer conductor 29. The delay line for this arrangement would have an oval shaped hollow center.

Figure 4:
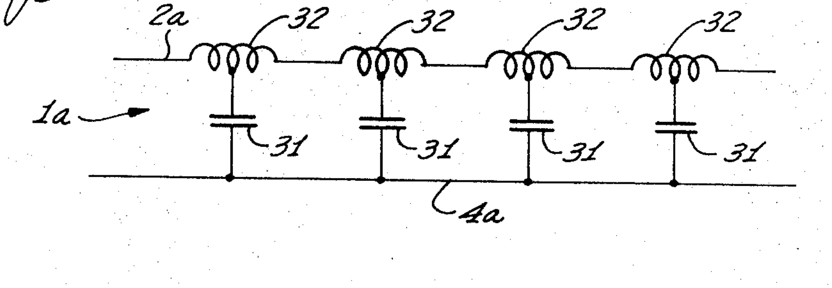
FIG. 4 is a schematic diagram of an alternate delay line construction which may be employed.

The delay line described so far has been of a distributed-constant construction. For instance, in FIG. 1, the helical winding 2 is continuous, and a distributed capacitance 30 inherently exists all along the line between the winding 2 and the outer conductor 4. However, it may be desirable to use a lumped-constant delay line 1*a* as shown schematically in FIG. 4, where actual capacitor units 31 are employed between the winding 2*a* and the outer conductor 4*a*, and where the winding 2*a* may or may not consist of a series of separate coils 32. The purpose and effect of such a lumped-constant delay line would be to achieve a greater time delay per unit of length. The outer conductor 4*a* of such a delay line can comprise a few large conducting strips instead of the many parallel copper wires 22 shown in FIG. 2.

Figure 5:
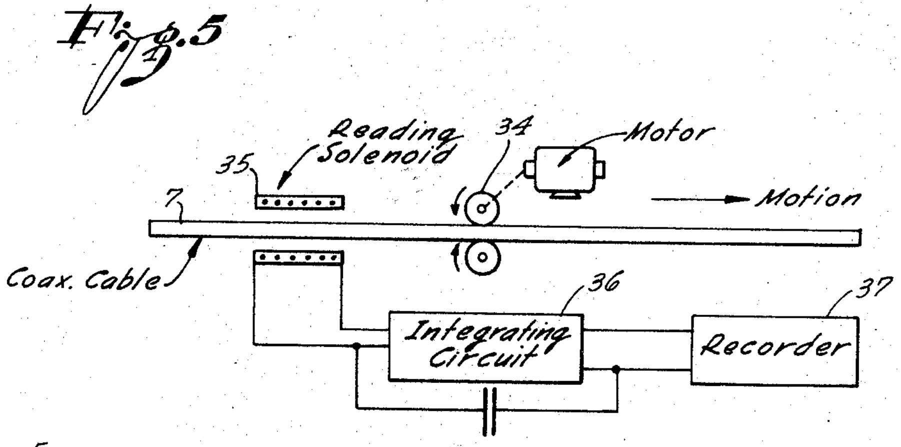
FIG. 5 is a schematic diagram showing how read-out of the recorded material is obtained.

After the desired recording has been accomplished, the input signal can be reproduced as shown in FIG. 5. The magnetized coaxial cable 7 is removed from the delay line 1 and drawn at constant velocity as by motor-driven rolls 34 through a reading solenoid 35 which is electrically connected to an integrating amplifier circuit 36. Solenoid 35 should be physically short to obtain good time resolution. Thus, a voltage signal is produced which duplicates the input signal, and which can be spread out over a much longer time scale than the original recorded signal. A visual recorder 37, such as an X–Y plotter, can be connected to the integrating circuit 36 to convert the reproduced signal directly to a visual record thereof. Reading time for a three-foot cable might be ten seconds or more if desired.

From the above, it is thus seen that the present delay line recorded is an electromagnetic transport technique, in contrast to the usual mechanical transport of standard tape or wire recorders. Instead of having the recording medium drawn past or through the signal magnetic field, the present invention propagates or transports the signal field past the recording medium. This enables the present recording system to have a time sweep on the order of a few microseconds. The most immediate application for this invention is to replace the oscilloscopes and long coupling cables used now for recording during field testing.

For particular applications, the delay line of this invention may be somewhere from one to six feet long, for example. If it has a time delay characteristic of one microsecond per foot, its capacity would be up to six microseconds of signal information. In radiation environment field testing, for example, only a very few microseconds of information are being generated. But of course there is no limit to the length of the recorder components as far as this invention is concerned.

The bias source 11 is a generator of either a damped AC pulse or a straight DC pulse roughly 0.033 microsecond long, or less, for example. This "freezes" the recorded input pulse information on the coaxial line before the signal has a chance to move significantly along the delay line. Since the bias or "writing" magnetic field is transverse and the signal field is axial, the AC bias pulse of high frequency will naturally not appear in the read-out from the system, since the reading solenoid 35 detects only the axial field.

In actual practice, the input signal to be recorded may be an eight-microsecond pulse of about 30 volts, for example. With this value, the bias pulse could be about 500 volts at 6 amperes, to produce a remnant induction in coaxial central conductor 9 of at least 30 gauss. The output of the integrating amplifier 36 will be in the neighborhood of one volt assuming a reasonable time period for drawing the coaxial cable through a solenoid 35 having 20,000 turns of wire. This performance is when using a central recording conductor consisting of wire 15 and $VFe_2O_3$ as the magnetic coating 16 (FIG. 2). More efficient magnetic materials such as carbon steel and alloys of iron, nickel and cobalt yield much higher remnance induction levels for the same applied fields, allowing a greater output voltage or less stringent readout system parameters. The magnetic coating composition may be embedded in or bonded to the wire 15 which merely acts a carrier, much the same way as magnetic recording tapes are constructed.

In operation, the bias field is momentarily applied to the coaxial cable 7 at a chosen time when the desired signal to be recorded is wholly contained in the delay line 1. Switching means 12 can be simply a trigger circuit producing the desired bias pulse width and connected through a known time delay circuit (not shown) to the original signal source 5.

Figure 6:
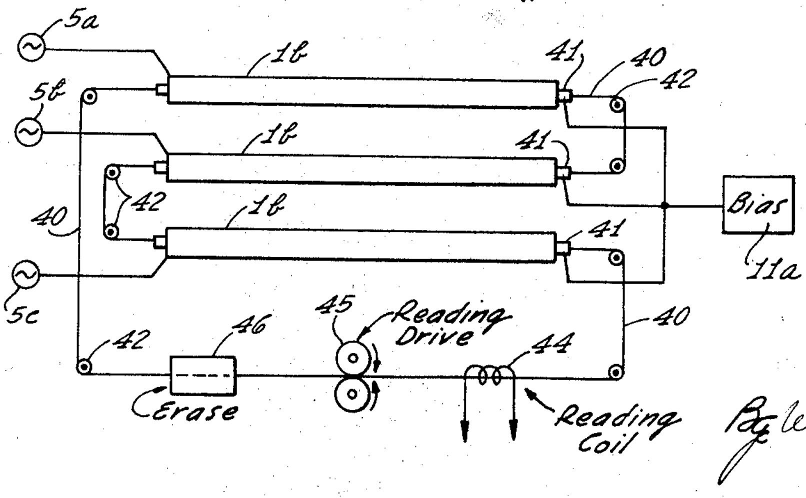
FIG. 6 is a diagrammatic view showing an example of the combination of several of the present recorders.

An extension of the present system is the use of several relatively short lengths of recording line, either to simultaneously record several separate coincident signals, or arranged to serially record a signal of longer duration than can be recorded on a single given length of cable. FIG. 6 illustrates the first of these arrangements. Here, a plurality of delay lines 1*b* is provided, and a single, endless flexible coaxial cable central conductor 40 is threaded through an associated return segment 41 in each delay line 1*b* by means of idler pulleys 42 or the like, and also through a reading coil 44, reading drive 45, and erasing means 46. Separate signal sources 5*a*, 5*b*, and 5*c* are connected respectively to the delay lines 1*b*, and a bias circuit 11*a* is connected in parallel to each coaxial cable segment 41 within the delay lines. In this manner, signals in separate channels can be recorded simultaneously, then the flexible conductor 40 is pulled through the reading coil 44 to make a permanent record of each, and the flexible conductor 40 is thus already positioned in the delay lines for a subsequent recording operation.

Other arrangements and applications of the present method can also obviously be used. It will be seen that the inherent simplicity of this recorder makes its reliability very high. There are no moving parts during the recording operation, as distinguished from other types of recording systems. The present apparatus is also easily hardened to radiation, vibration, and shock, and is therefore advantageous for airborne and space applications.

While in order to comply with the statute, the invention has been described in language more or less specific as to structural features it is to be understood that the invention is not limited to the specific features shown, but that the means and method herein disclosed comprise preferred forms of putting the invention into effect, and the invention is therefore claimed in any of its forms or modifications within the legitimate and valid scope of the appended claims.

What is claimed is:

1. A magnetic line recorder comprising a hollow electronic delay line having a delay winding and an outer return conductor, a coaxial cable of magnetic material removably positioned within said delay line, means for applying an electrical signal to be recorded to said delay line, means for momentarily applying a writing bias pulse to said coaxial cable, wherein said coaxial cable comprises an inner coaxial magnetizable conductor and a relatively thin non-magnetic coaxial outer conductor insulated from said inner coaxial conductor, and wherein said delay line comprises hollow inner spacer means, an inner delay conductor comprising a helical winding around said spacer means, and an outer delay conductor comprising generally lengthwise elements electrically connected together and separated from said winding by insulating means, whereby the combination of signal field and bias field impressed on said cable will produce a distributed remnant magnetization record on said cable corresponding to the stretched out signal appearing on said delay line at the instant of bias pulse application.

2. A recording and reproducing system comprising a hollow electronic delay line having a delay winding and a return conductor, a removable two-conductor coaxial cable inserted within said delay line, means for spatially recording a signal occupying said delay line at a given instant onto said coaxial cable, and reading means for subsequently reading said recorded signal from said coaxial cable at a substantially slower rate than the recording thereof.

3. A recording and reproducing system comprising a hollow electronic delay line, a removable coaxial cable inserted within said delay line, means for spatially recording a signal from said delay line onto said coaxial cable, and reading means for subsequently reading said recorded signal from said coaxial cable at a substantially slower rate than the recording thereof, said reading means comprising a reading solenoid, an integrating circuit connected to said solenoid, and means for causing readout motion between said coaxial cable and said solenoid.

4. A magnetic line recorder comprising a hollow electronic delay line, a source of a signal to be recorded connected between the time delay winding and return conductor of said delay line at one end of the latter, a first terminal resistance connected between said winding and said return conductor at the opposite end of said delay line, a coaxial cable of magnetic material positionable within said delay line, means for momentarily connecting a writing bias pulse between the inner and outer conductors of said coaxial cable at one end of the latter, and a second terminal resistance connected between said inner and outer conductors at the opposite end of said coaxial cable, whereby the combination of signal field and bias field impressed on said coaxial cable will produce a distributed remnant magnetization record on said cable corresponding to the stretched out signal appearing on said delay line at the instant of bias pulse application.

5. A recording and reproducing system comprising a plurality of magnetic line recorders; each said recorder including a hollow electronic delay line, a coaxial cable of magnetic material positionable within said delay line, means for applying a signal to be recorded to said delay line, and means for momentarily applying a writing bias pulse to said coaxial cable, whereby the combination of signal field and bias field impressed on said cable will produce a distributed remnant magnetization record on said cable corresopnding to the stretched out signal appearing on said delay line at the instant of bias pulse application; the said coaxial cables of all said recorders comprising a single flexible recording conductor threaded through all said delay lines of said system, and including a single reading solenoid and transport means for pulling said flexible conductor therethrough.

6. The method of recording a relatively short electrical signal which comprises feeding said signal to an electronic delay line to create an axial signal field within said delay line distributed therealong, and applying a single bias pulse to a record medium having magnetic properties and located in a stationary position within said delay line to create a transverse writing field, said bias pulse being strong enough to produce, with said signal, remnant magnetization of said record medium, said bias pulse being applied and released substantially instantaneously when said signal is distributed at the desired space along said delay line, whereby said signal is magnetically recorded and preserved along said record medium.

7. A magnetic line recorder comprising a hollow electronic delay line having a delay winding and an outer return conductor, a two-conductor coaxial cable having one conductor of magnetic material removably positioned within said delay line, means for applying an electrical signal to be recorded to said delay line, and means for momentarily applying a single writing bias pulse to said coaxial cable, whereby the combination of signal field and bias field impressed on said cable will produce a distributed remnant magnetization record on said magnetic conductor corresponding to the stretched out signal appearing on said delay line at the instant of bias pulse application.

References Cited

UNITED STATES PATENTS

| | | | |
|---|---|---|---|
| 2,762,861 | 9/1956 | Somers | 178—6.6 |
| 2,890,275 | 6/1959 | Lesti | 178—6.6 |
| 2,897,294 | 7/1959 | Lipkin | 333—29 |
| 3,290,622 | 12/1966 | Hair | 333—29 |
| 3,083,353 | 3/1963 | Bobeck | 340—174 |
| 3,325,793 | 6/1967 | Simkins et al. | 340—174 |
| 2,854,640 | 9/1958 | Nordlin | 340—174 |
| 2,954,550 | 9/1960 | Starr et al. | 340—174 |
| 3,016,196 | 1/1962 | Mallery | 340—174 |
| 3,046,501 | 7/1962 | Dell et al. | 340—174 |
| 3,154,767 | 10/1964 | Shook | 340—174 |
| 3,310,665 | 3/1967 | Schimmel | 340—174.1 |
| 3,320,596 | 5/1967 | Smith et al. | 340—174 |
| 3,353,164 | 11/1967 | Folsom | 340—174.1 |
| 3,354,447 | 11/1967 | Oshima | 340—174.1 |
| 3,381,138 | 4/1968 | Oshima et al. | 340—174 |

BERNARD KONICK, Primary Examiner

V. P. CANNEY, Assistant Examiner

U.S. Cl. X.R.

333—29; 346—74